US006717826B2

United States Patent
Noon et al.

(10) Patent No.: US 6,717,826 B2
(45) Date of Patent: Apr. 6, 2004

(54) METHOD TO REDUCE BUS VOLTAGE STRESS IN A SINGLE-STAGE SINGLE SWITCH POWER FACTOR CORRECTION CIRCUIT

(75) Inventors: James P. Noon, Merrimack, NH (US); Alexander Borisovich Uan-Zo-Li, Blacksburg, VA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/134,419

(22) Filed: Apr. 29, 2002

(65) Prior Publication Data

US 2003/0142516 A1 Jul. 31, 2003

Related U.S. Application Data

(60) Provisional application No. 60/354,066, filed on Jan. 31, 2002.

(51) Int. Cl.[7] .............................................. H02M 3/335
(52) U.S. Cl. .................................. 363/21.11; 363/21.05
(58) Field of Search ........................... 363/21.18, 21.06, 363/21.07, 21.09, 16, 17, 20, 41; 323/222, 223, 284, 285, 286, 41, 2; 327/538, 540, 541

(56) References Cited

U.S. PATENT DOCUMENTS 5,498,995 A * 3/1996 Szepesi et al. .............. 327/538
5,710,697 A * 1/1998 Cook et al. ................ 363/21.11

OTHER PUBLICATIONS

Qiao, "A Topology Survey of Single–Stage Power Factor Corrector with a Boost Type Input–Current Shaper", 2000 IEEE, pp. 1–8, no date.
Jovacovic, "Reduction Of Voltage Stress In Integrated High–Quality Recitifier–Regulators By Variable–Frequency Control", 1994 IEEE, pp. 569–575, no date.
Laszlo Huber and Milo M. Jovanovic, "Single–Stage Single–Switch Input–Current–Spacing Technique with Reduced Switching Loss," IEEE Transactions on Power Electronics, Jul. 2000, pp. 681–687, vol. 15, No. 4.

* cited by examiner

Primary Examiner—Rajnikant B. Patel
(74) Attorney, Agent, or Firm—W. Daniel Swayze, Jr.; W. James Brady; Frederick J. Telecky, Jr.

(57) ABSTRACT

The present invention provides an apparatus and method for reducing the voltage stress in a single-stage single-switch (SSSS) converter by modulating the predetermined operating frequency of the converter lower responsive to increasing voltage stress. A control circuit (116) and associated cooperable frequency setting capacitance (CT) and resistance (RT) are coupled to the primary circuit (112) and the secondary circuit (114) of the SSSS converter via a switch (120). A frequency foldback device (180) is coupled to CT or RT and cooperable therewith to lower bus voltage stress by modulating the switch frequency. The operating frequency is modulated (i.e. reduced) from the predetermined operating frequency upon detection of a voltage threshold transition.

9 Claims, 2 Drawing Sheets

METHOD TO REDUCE BUS VOLTAGE STRESS IN A SINGLE-STAGE SINGLE SWITCH POWER FACTOR CORRECTION CIRCUIT

This application claims the priority under 35 U.S.C. 119(e)(1) of copending U.S. provisional application No. 60/354,066, filed on Jan. 31, 2002 and incorporated herein by reference.

BACKGROUND OF THE INVENTION

1. Technical Field of the Invention

The present invention relates to power electronics and, more particularly to a single stage single switch power factor correction circuit with reduced voltage stress.

2. Description of Related Art

A conventional method of solving the problem of harmonic current in a power supply is the power factor correction (PFC) circuit. For example, input AC power is rectified by a bridge-type rectifier device and input to a PFC circuit for power correction, then converted by a voltage converter for outputting to a load.

In this single-stage approach, input current shaping and isolation are performed in a single step. Further, this single stage is implemented with only one controlled semiconductor switch. These single-stage single-switch circuits integrate a step-up inductor and an energy storage capacitor. When the single switch is switched on, the electric current flow through the inductor to a first transformer coil for providing energy to a secondary coil of a DC voltage transformer and storing energy in the inductor. When the switch is switched off, the energy stored in the inductor is delivered to the energy storage capacitor.

The voltage on the bus or boost capacitor varies with the inputted AC power. Therefore, if the AC power is a wide-range AC input and the load has wide variations, then the voltage on the capacitor will vary enormously depending on the design thereof. In order to endure high voltage and have a sufficient capacitance for decreasing the variation in the output voltage, a capacitor with higher capacitance and higher voltage rating is required. However, this type of capacitor is very expensive and bulky. Because of this problem, currently used single-stage single-switch PFC circuits generally suffer from excessive voltage stress on their energy storage capacitor which limits their use and drives up cost.

One approach to this problem includes the addition of a "feedback" winding to reduce the voltage stress as described in, "Single Stage, Single Switch Input Current Shaping Technique with Reduced Switching Loss" by Laszlo Huber and Milan Jovanovic, IEEE Volume 15, No.4, July 2000. With this feedback winding approach, two additional primary windings are employed to keep the voltage of the energy-storage capacitor below a desired level in the entire line and load ranges (e.g., 400 V at the universal line range of 90–264 Vrms). However, this feedback approach has shortcomings which leads to increased cost and increased complexity of the converter.

SUMMARY OF THE INVENTION

The present invention achieves technical advantages as method and apparatus for reducing the voltage stress in a single-stage single-switch (SSSS) converter by modulating the predetermined operating frequency of the converter lower responsive to increasing voltage stress. A control circuit and associated cooperable frequency setting capacitance (CT) and resistance (RT) are coupled to the primary circuit and the secondary circuit of the SSSS converter via a switch. A frequency foldback device is coupled to CT or RT and cooperable therewith to lower bus voltage stress by modulating the frequency of the switch. The operating frequency is modulated (i.e. reduced) from the predetermined operating frequency upon detection of voltage threshold transition.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
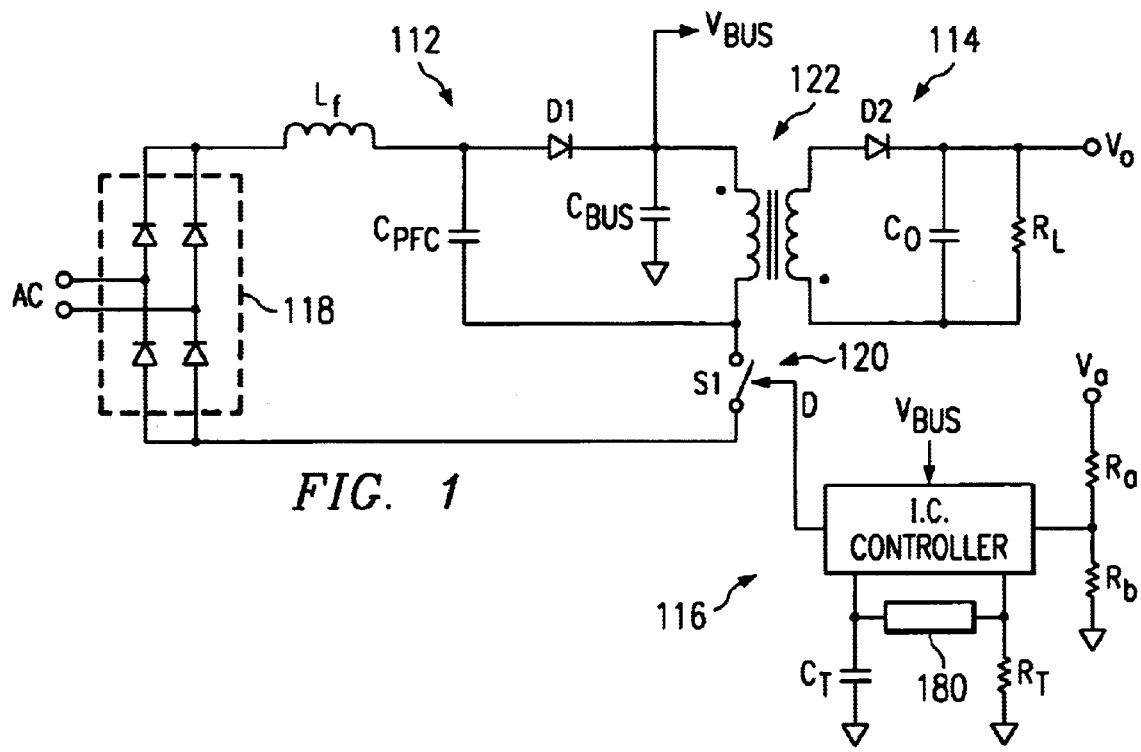
FIG. 1 illustrates a single-stage single-switch power factor correction circuit.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Referring now to FIG. 1 there is illustrated a simplified diagram of a single-stage single-switch power factor correction (PFC) circuit in accordance with an embodiment of the present invention. AC power is received on the AC input terminals and DC power is output at output terminals Vo. The PFC circuit includes a primary circuit 112, a secondary circuit 114 and a control circuit 116. Rectifier bridge diodes 118 rectify the AC voltage received on the input terminals, from AC power mains for example. The PFC circuit further includes a power switch 120, such as a power field effect transistor, and a magnetic component 122, such as a power transformer or coupled-inductor. The transformer 122 includes a pair of primary windings and a secondary winding. The diode (D1) of the primary circuit 112 determines which primary winding is energized when the power switch 120 is conductive. A storage capacitor (Cbus) provides energy to operate the PFC circuit when the mains voltage is low as well as providing intermediate energy storage required of PFC circuits.

The secondary circuit includes a rectifier circuit (capacitor Co and diode D2) for rectifying the current flowing from the transformer secondary. The control circuit 116 controls the On time of the power switch 120 to maintain a regulated DC voltage on the output terminals. The control circuit 116 can be a traditional pulse width modulation (PWM) control I.C. It varies the duty cycle (On time/Period=duty cycle) to the controlled switch 120. It also contains an oscillator which sets the switching frequency, an error amplifier and other ancillary circuitry. It can also contain over-voltage and/or over-current protection circuits.

The frequency is determined by the selection of resistor RT and capacitor CT. In this example, RT sets the charging current which is fed into CT. Once RT is set, the oscillator period is determined by the selection of CT through the relationship I=c*dv/dt. The dv is determined by the internal circuitry of the controller, the upper and lower oscillator threshold voltages, c is CT, I is the current established through RT and dt is the oscillator period. There may be a scaling of the currents and/or voltages and perhaps offsets as well, but this doesn't significantly change the oscillator operation.

This type of circuit is generally know as a voltage source converter. A further description of the power stage topology for this type of voltage source converter is described in U.S. Pat. No. 5,301,095, Teramoto et al., issued Apr. 5, 1994, which is incorporated herein by reference. Although the present invention is describe in terms of a voltage source converter, it can be used for similar type circuits.

In accordance with the present invention, a frequency foldback device 180 is coupled to CT or RT and cooperable therewith to lower bus voltage stress by modulating the operating frequency. The operating frequency is modulated (i.e. reduced) from a predetermined operating frequency when a monitored switch current or bus voltage meets a predetermined threshold.

Figure 2:
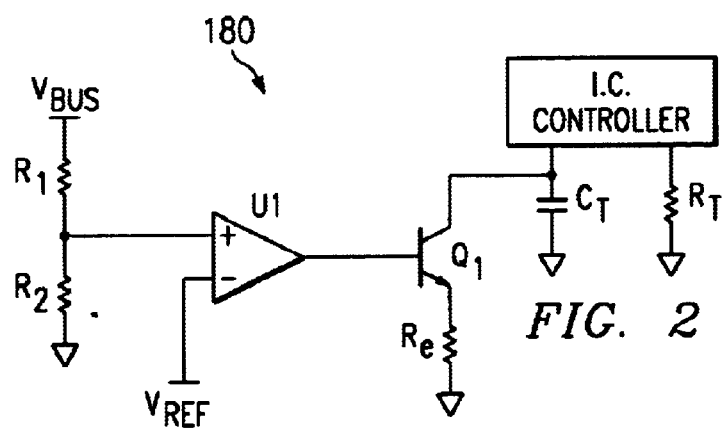
FIG. 2 illustrates a circuit diagram of frequency foldback in accordance with an exemplary embodiment of the present invention.

Referring now to FIG. 2 there is illustrated an embodiment of the frequency foldback device 180 shown in FIG. 1. Resistors R1 and R2 are coupled in a voltage divider arrangement as an input to comparator U1. U1 also has a voltage reference ($V_{REF}$) coupled to another input. Resistors R1 and R2 divide down the bus voltage ($V_{BUS}$) so that it can be compared to the relatively low $V_{REF}$. U1 changes states once the threshold established by $V_{REF}$ has been reached. The output of U1 is coupled to the gate of transistor Q1. Further, a resistor (Re) is coupled between the source of Q1 and ground. The drain of Q1 is coupled to a node between the I.C. Controller and capacitor CT. Resistor RT is also coupled to the I.C. Controller.

Thus, when the voltage on Cbus rises above the threshold, the output of U1 changes states from low to high, transistor Q1 is turned On which effectively forces a constant voltage across Re. This effectively enables Q1 to operate as a current sink. This current sink formed by Q1 and Re pulls a fixed amount of current away from CT, i.e. the charge current to CT is reduced. This increases the time it takes for CT to reach its upper threshold thereby lowering the frequency which causes the voltage on Cbus to drop.

Preferably, the frequency is lowered significantly, i.e. from the conventional 100 kHz to as low as approximately 20 kHz. A result of this magnitude of frequency drop is a reduction in bus voltage stress from approximately 455V to 419V. Since the maximum voltage rating of a typical Cbus capacitor used for this type of application is 450V, the present approach enables the converter to operate without overstressing or damaging the capacitor.

It should be noted that the present technique could also work if U1 was configure as an op amp. Instead of an abrupt change in state it would operate in a linear mode. This would have the effect of varying the frequency smoothly instead of abruptly.

Figure 3:
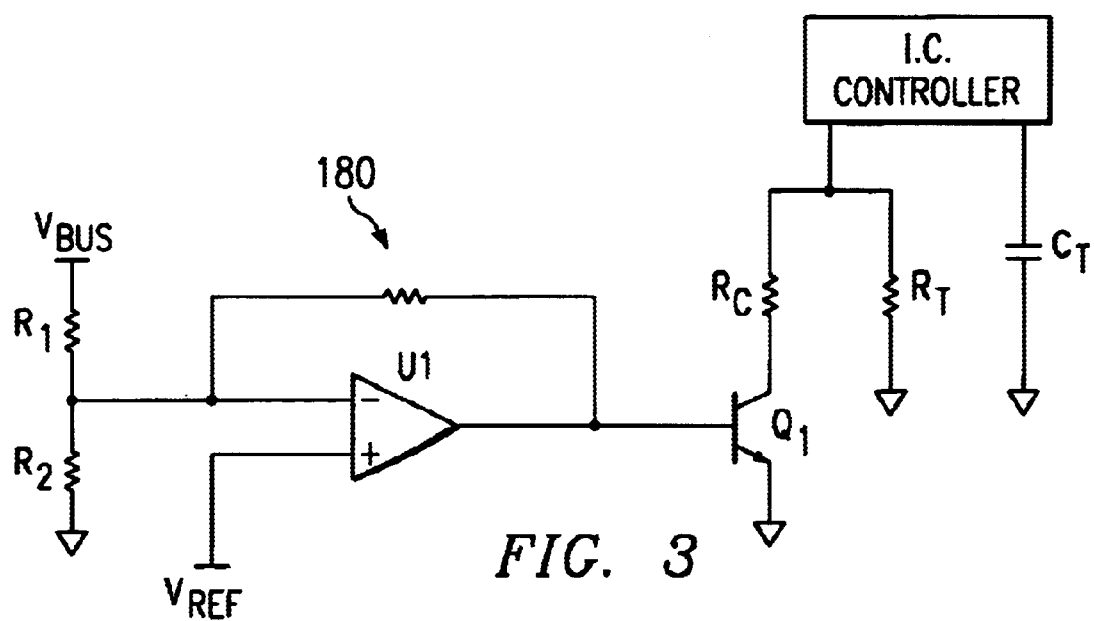
FIG. 3 illustrates an alternative circuit diagram of frequency foldback in accordance with an exemplary embodiment of the present invention.

Referring now to FIG. 3 there is illustrated another embodiment of the frequency foldback device 180 shown in FIG. 1. Here, the source of Q1 is coupled to ground and the drain is coupled to a resistor Rc which is further coupled in parallel with RT. The circuit of FIG. 3 functions similarly to the circuit of FIG. 2, however, instead of reducing the current available to CT by providing an alternate path through Q1 (as in FIG. 2), Q1 is turned On and driven into saturation when an appropriate trip point is reached (determined by the selection of R1 and R2 and the VREF input to U1). This effectively places Rc in parallel with RT. This also reduces the charging current to CT which reduces the switching frequency which reduces the voltage on Cbus.

It should be noted that this technique could also work if U1 was configured as an op amp or comparator. Instead of an abrupt change in state it could operate in a linear mode. This would have the effect of varying the frequency smoothly instead of abruptly.

Figure 4:
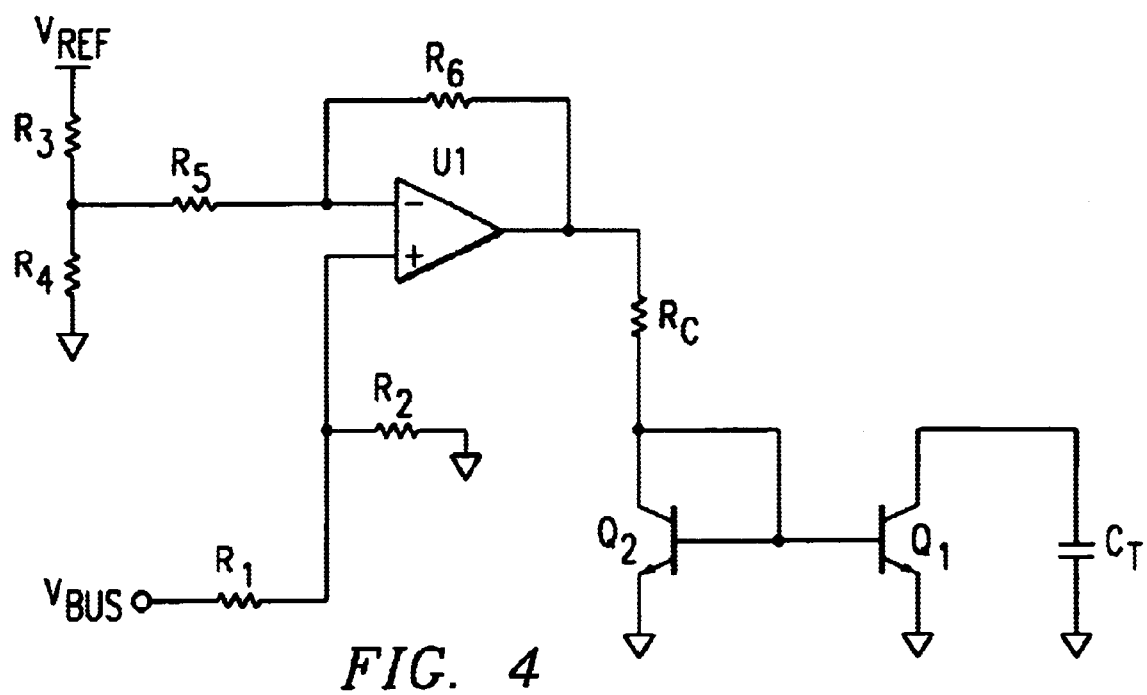
FIG. 4 illustrates an alternate circuit diagram of frequency foldback in accordance with an exemplary embodiment of the present invention.

FIG. 4 shows another method for implementing this technique. The circuit operation is essential the same as previously describe. Resistors R1 and R2 as well as U1 have the same function. In FIG. 4, Q1 and Q2 are configured in a current sink arrangement. Rc sets up the reference current for Q1 and Q2. These transistor then pull charging current away from Ct when the reference voltage of U1 is exceeded thereby reducing the switching frequency.

Further, it should also be noted that the description of FIGS. 2, 3, and 4 apply to discrete component implementations. The same techniques can be implemented within an integrated circuit in accordance with an embodiment of the present invention. In this case the circuit configuration would be a little different (by necessity) but the function would be the same.

It should also be noted that the control I.C. can have an external separate Ct and Rt or one or both of these components can be internal to the control I.C. (116 in FIG. 1).

There has been an attempt to reduce bus voltage stress by modulating operating frequency, however, it was implemented in converters which operated in the discontinuous conduction mode (DCM) and the frequency was increased (as opposed to decreasing the frequency) to reduce the stress. The present approach applies to converters which operate in the continuous conduction mode (CCM). Operating in CCM has the advantage of reducing the peak switch and inductor currents in the converter. For the same power level, DCM would have much higher peak currents and therefore have higher stress on the components. In some cases this also leads to higher losses i.e. reduced efficiency. This in turn can drive cost up due to higher cost components and/or more challenging thermal design.

It is counter intuitive to lower the frequency. On first glance it would seem that raising the frequency would keep the converter in CCM and this would help reduce the voltage. Attempts have been made to reduce voltage stress by increasing the operating frequency because the thought was that at light loads the converter entered DCM operation and this was causing the voltage to rise. Raising the frequency would logically cause the converter to stay in CCM longer. So, reducing the frequency goes against the logic. Second, a converter operating in CCM is typically immune to frequency shifts. A converter operating in DCM has a dc transfer function which is load dependant. The dc transfer function for a converter operating in CCM is load independent. Therefore changing the frequency should have no effect on the converter. With the present approach however, it does.

Other advantages of the present approach are that it is easily implemented and it lends itself to implementation in an integrated circuit which has the potential of being low cost compared to additional magnetic components of other solutions.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for providing operating frequency modulation of the switch in a single-stage single-switch converter for reducing voltage stress, comprising:
   a capacitor having a capacitance and coupled to a controller associated with said switch;
   a resistance coupled to said controller and cooperable with said capacitor for determining an operating frequency for the switch, wherein said resistance determines the charging current applied to said capacitor; and
   a frequency foldback device adapted to reduce said determined operating frequency and having an input for receiving an indication of the bus voltage of said converter for comparison to a threshold and coupled between said capacitor and said resistance and operable to reduce said charging current applied to said capacitor responsive to a threshold detection.

2. The apparatus of claim 1, wherein said frequency foldback device comprises a comparator having a first input for receiving said bus voltage indication and a second input for receiving a reference voltage, wherein said reference voltage determines said threshold, said comparator further having an output for sending a drive signal to a current sink responsive to detection of said threshold, wherein said current sink is coupled in parallel with said capacitor.

3. The apparatus of claim 2, wherein said current sink comprises a transistor having a gate for receiving said drive signal and a source coupled to a further resistance and a drain coupled to said capacitor and operable to apply a constant voltage across said further resistance responsive to said drive signal.

4. The apparatus of claim 1, wherein said frequency fold back device comprises a comparator having a first input for receiving said bus voltage indication and a second input for receiving a reference voltage, wherein said reference voltage determines said threshold, said comparator further having an output for sending a drive signal to a further switch for switching a further resistance in parallel with said resistance responsive to detection of said threshold.

5. The apparatus of claim 4, wherein said further switch comprises a transistor having a gate for receiving said drive signal and a drain coupled to said further resistance, wherein said transistor is driven into saturation and said further resistance is switched in parallel with said resistance responsive to said drive signal.

6. The apparatus of claim 1, wherein said voltage stress is reduced to approximately 419 volts.

7. The apparatus of claim 1, wherein said voltage stress of said primary circuit is reduced approximately eight percent.

8. The apparatus of claim 1, wherein said frequency foldback device is implemented in an integrated circuit.

9. The apparatus of claim 1, wherein said frequency foldback device and at least one of said capacitor and said resistance is implemented in an integrated circuit.

* * * * *